United States Patent [19]

Auburn et al.

[11] Patent Number: 6,031,055
[45] Date of Patent: Feb. 29, 2000

[54] OLEFIN POLYMERIZATION USING ALUMINOXANE/CHROMIUM CATALYSTS

[75] Inventors: Pamela R. Auburn; David L. Beach, both of Kingwood, Tex.

[73] Assignee: Chevron Chemical Company, San Ramon, Calif.

[21] Appl. No.: 08/008,256

[22] Filed: Jan. 25, 1993

Related U.S. Application Data

[63] Continuation of application No. 07/787,809, Nov. 4, 1991, abandoned.

[51] Int. Cl.[7] .................................. C08F 4/44; C08F 2/00
[52] U.S. Cl. ......................... 526/127; 526/129; 526/156; 526/160; 526/165; 526/86
[58] Field of Search .................................. 526/127, 129, 526/156, 160, 165, 86

[56] References Cited

U.S. PATENT DOCUMENTS

| | | | |
|---|---|---|---|
| 3,231,550 | 1/1966 | Manyik et al. | 260/88.2 |
| 3,242,099 | 3/1966 | Manyik et al. | 252/429 |
| 3,347,840 | 10/1967 | Manyik et al. | 260/94.9 |
| 4,404,344 | 9/1983 | Sinn et al. | 526/160 X |
| 4,668,838 | 5/1987 | Briggs | 585/513 |
| 4,701,432 | 10/1987 | Welborn, Jr. | 502/113 |
| 4,752,597 | 6/1988 | Turner | 502/104 |
| 4,777,315 | 10/1988 | Levine et al. | 585/512 |
| 4,791,180 | 12/1988 | Turner | 526/160 |
| 4,960,878 | 10/1990 | Crapo et al. | 556/179 |
| 5,013,802 | 5/1991 | Tajima et al. | 526/86 |

FOREIGN PATENT DOCUMENTS 2000567  4/1990  Canada.

OTHER PUBLICATIONS

Billmeyer, *Textbook of Polymer Science,* Third Edition, (1984), pp. 16–18.

*Primary Examiner*—Glenn Caldarola
*Assistant Examiner*—Thuan D. Dang
*Attorney, Agent, or Firm*—Witta O. Priester

[57] ABSTRACT

A method of controlling the molecular weight distribution of a polyalpha-olefin during polymerization, comprising changing the aluminoxane to chromium ratio of a polymerization catalyst comprising chromium and at least one aluminoxane to thereby adjust the molecular weight distribution.

23 Claims, 3 Drawing Sheets

OLEFIN POLYMERIZATION USING ALUMINOXANE/CHROMIUM CATALYSTS

CROSS REFERENCE TO RELATED APPLICATION

This application is a continuation of application Ser. No. 787,809, filed Nov. 4, 1991, now abandoned.

BACKGROUND OF THE INVENTION

The present invention relates to a process for preparing polyethylenes having a broad molecular weight distribution. More particularly, it is concerned with a continuous process for preparing polyethylene of varying polydispersities by combining an aluminoxane with a chromium compound and varying the ratio of these metal components.

In general, polyolefins used for obtaining molded or formed articles such as bottles, cable conduits and ultrathin films are required to fully withstand molding or forming conditions in plastisized state and be formed into desired shapes easily. This requirement may be satisfied by the use of a polyolefin having an increased melt index (a lowered average molecular weight). Such a polyolefin, however, can only afford a product inferior in strength, e.g. impact resistance and tensile strength. On the other hand, a polyolefin having a low melt index affords a product superior in strength, which product, however, is inferior in moldability. It is known that this problem can be solved by using a polyolefin having a broad molecular weight distribution.

Moreover, physical properties required for polyethylenes have been diversified recently, and also from the standpoint of resources saving there is a tendency to using polymer resin in an amount as small as possible in a range not impairing physical properties. For example, as to bottles and films, there is now a tendency to make them as thin as possible while maintaining their strength. A polyethylene which even in a small amount exhibits good processability and high impact strength, tensile strength and resistance to environmental stress cracking is keenly desired. Ziegler-Natta and chromium based systems comprise the two major classes of olefin polymerization catalysts. Aluminoxanes, especially methylaluminoxane, have recently found wide application, in conjunction with Group IV and V metallocenes, as components of Ziegler-type olefin polymerization catalysts. (See, for example, numerous papers by W. Kaminsky and J. C. W. Chien).

In contrast, the use of aluminoxanes in conjunction with chromium catalysts is limited. Catalysts produced from aluminoxanes and chromium salts, usually alkanoates, and an electron donating ligand such as hydrocarbyl isonitriles, amines, or ethers (U.S. Pat. No. 4,668,838 to Briggs), or carbon dioxide (U.S. Pat. No. 4,777,315 to Levine) have been reported as ethylene trimerization catalysts. Some polyethylene is also produced.

In the late 1960's Manyik et al. disclosed polymerization catalysts and processes which produced polyethylenes having a broad molecular weight distribution. U.S. Pat. Nos. 3,231,550 and 3,242,099 disclose polymerization of mono-unsaturated alpha-olefins to produce solid high molecular weight polymers by contacting them with a catalyst complex comprised of (1) poly(hydrocarbylaluminum oxides), i.e. an aluminoxane, and (2) a transition metal compound of the metals of Groups IVA, VA, and VIA; chromium is exemplified. Manyik states that, "The mole ratio of the transition metal in the transition metal compound to the aluminum in the poly (hydrocarbylaluminum oxide) can be varied from 1:30 to about 1:800 but is preferably from about 1:40 to 1:200. By varying the ratios of the components used to produce the catalyst complex and the components employed and by varying the temperature, pressure, and time of reaction, the properties of the polyolefin can be varied."

A later patent to Manyik, U.S. Pat. No. 3,347,840, discloses an improved polymerization process for ethylene polymerization. As before, this process uses a catalyst complex of poly(hydrocarbylaluminum oxides) and a transition metal compound of the metals of Groups IV-A, V-A and VI-A. Here however, conversion of ethylene to 1-hexene is retarded drastically by the addition of small amounts of 1,3-dienes, such as butadiene. This improvement was in response to one of the disadvantages of the previous processes, specifically, the conversion of appreciable amounts of ethylene to butene-1 or hexene-1.

More recently, Canadian Patent Application No. 2,000,567 to Tajima et al. disclosed a composite catalyst consisting of a chromium compound, an aluminoxane, and an aluminum alkoxide. This catalyst produces polymers with improved rheological properties. This patent, in comparative examples 1, 2 and 3 on page 18 purports to show combinations of aluminoxanes and chromium catalysts, without aluminum alkoxides. These comparative examples, however, were apparently somehow mislabeled, and the results are inscrutable.

U.S. Pat. No. 5,013,802, also to Tajima et al, discloses a process for the preparation of polyethylene with a broad molecular weight distribution. The process uses two catalysts in series. The first catalyst is a calcined chromium-oxide supported catalyst combined with modified organoaluminum compound which is produced by hydrolysis of a trialkylaluminum. The second catalyst consists of an organomagnesium compound and titanium. In the first stage of the polymerization, a high molecular weight polymer is produced when the chromium-oxide supported solid catalyst and modified organoaluminum compound is used. In the second stage, relatively low molecular weight polymer results when a solid catalyst with at least magnesium, titanium, and an aluminum compound is used. When this two stage highly productive process is employed, a well balanced ethylene polymer or copolymer with large melt tension, good processability and high ESCR is produced.

U.S. Pat. No. 4,701,432 to Welburn teaches varying the molecular weight distribution by varying the molar ratios of metallocene to transition metal. The catalyst system described in this invention consists of a catalyst comprising a metallocene of Group IV-B or V-B metal and at least one non-metallocene of Group IV-B, V-B or V-I transition metal. A supported co-catalyst is also taught to be used in this invention comprising aluminoxane and organometallic compound of Group I-A, II-A, II-B and III-A.

U.S. Pat. Nos. 4,791,180 and 4,752,597 both purport to disclose olefin polymerization catalysts comprising the reaction product of an aluminoxane with a metallocene complex of among others, Group VIb metals, although metallocenes of Group VIb are neither exemplified nor discussed.

As described above, many approaches have been tried to produce polymers with broad molecular weight distributions. Still, there is a need for simple process where the molecular weight distribution of the polymer can be readily adjusted by varying polymerization parameters or reactants.

SUMMARY OF THE INVENTION

The present invention is a method of controlling the molecular weight distribution of a polyalpha-olefin, comprising changing the aluminoxane to chromium ratio of a polymerization catalyst comprising chromium and at least one aluminoxane to thereby adjust the molecular weight distribution (MWD) of the produced polyalpha-olefin. The ratio is increased to give a broader MWD or decreased to give a narrower MWD.

In one embodiment, the present invention is an alpha-olefin polymerization process comprising, a) continuously reacting an alpha-olefin with a catalytically effective combination of a chromium compound and an aluminoxane at a first aluminoxane to chromium ratio to produce a polyalpha-olefin having a first molecular weight distribution; and b) changing the aluminoxane to chromium ratio by at least five percent thereby giving a second aluminoxane to chromium ratio to produce a polyalpha-olefin having a second molecular weight distribution.

In another embodiment, the present invention is a continuous ethylene polymerization process comprising the steps of:

(a) combining a catalytically effective amount of a chromium compound and an aluminoxane in a hydrocarbon solvent, to produce a catalyst;

(b) mixing said catalyst with an alpha-olefin at a temperature of between 75 to 110° C. and at a olefin pressure of from 50–550 psi for an average residence time of from one to five hours; and (c) varying the ratio of said aluminoxane to said chromium compound so that the molecular weight distribution of the resulting polyethylene is modified over time.

In a preferred embodiment of our invention, the process utilizes a catalyst which consists essentially of a chromium compound, and an aluminoxane. Preferably the chromium compound is free of any electron donating ligands, such as those containing sulfur oxygen or nitrogen or carbon dioxide.

Among other factors, our invention is based on our discovery that not only is the combination of aluminoxane with chromium an attractive catalyst for producing polyethylene on a commercial scale—it is inexpensive, has good productivity for polyethylene, etc.—but, we have now discovered that the molecular weight distribution of the produced polyethylene polymer can be readily adjusted by varying the aluminoxane to chromium ratio. Moreover, this is accomplished without significantly affecting the polymer melt index, i.e., the weight average molecular weight. Thus, in a continuous catalytic polymerization of alphaolefin, the molecular weight distribution of the polyolefin may be varied simply by varying the ratio of aluminoxane to chromium, to produce polymers having different flow characteristics.

Although those skilled in the art have long been trying to control molecular weight distribution, and have even mixed aluminoxanes with chromium, it was never appreciated that the aluminoxane to chromium ratio could be adjusted to vary the polymer molecular weight distribution. Also, reaction conditions such as temperature and pressure can be kept constant and need not be varied as required by others in order to modify the flow characteristics of the polymer product, which are affected by the molecular weight distribution.

DETAILED DESCRIPTION OF PREFERRED EMBODIMENTS

Figure 1:
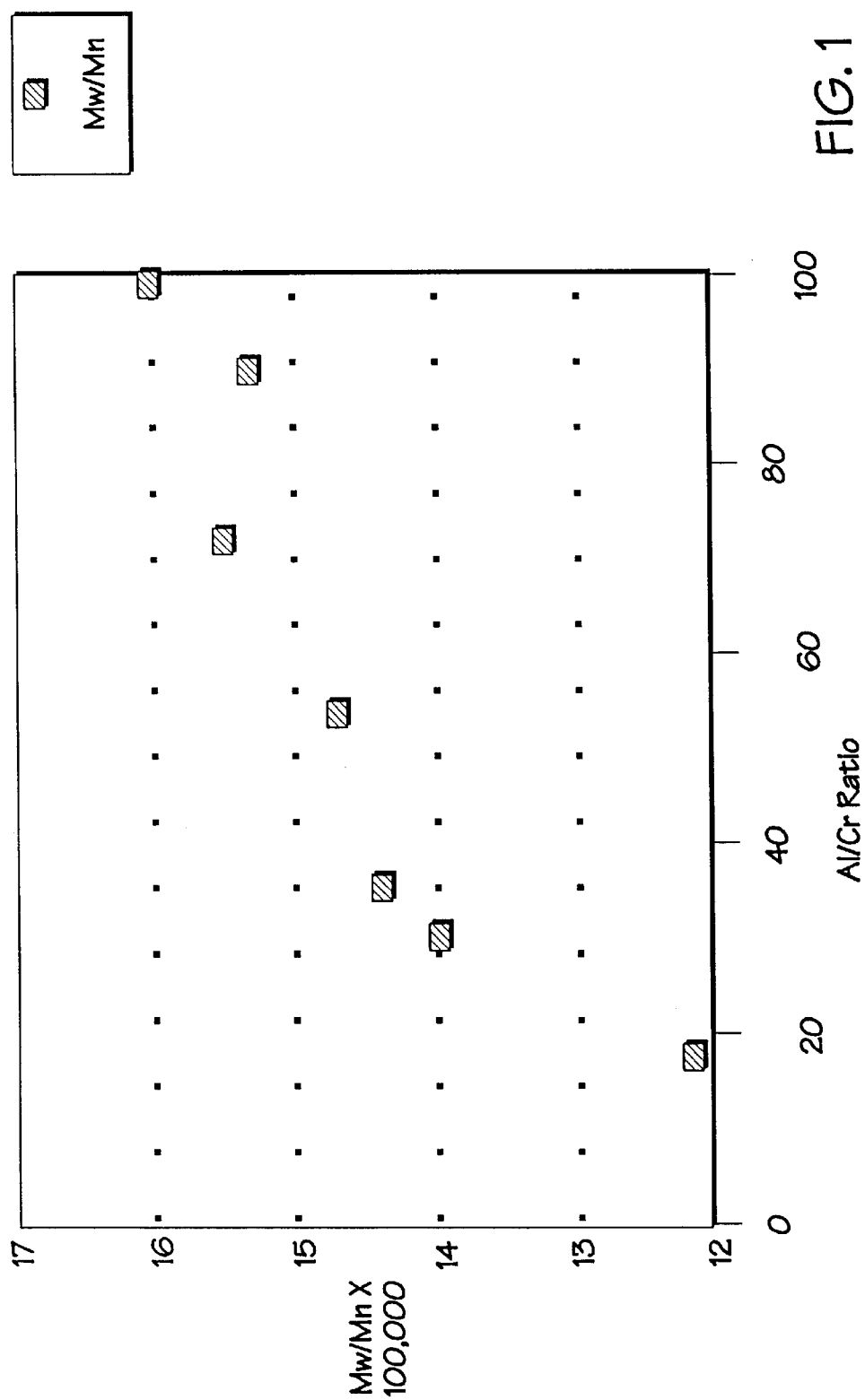
FIG. 1 is a graph showing the molecular weight distribution of polyethylenes prepared at different aluminoxane to chromium ratios.

The term molecular weight distribution (MWD) as used herein is Mw/Mn where Mw is the weight average molecular weight and Mn is the number average molecular weight. MWD can be measured using gel permeation chromatography. The MWD is approximately proportional to the MFR. Polydispersity is measured by the melt flow ratio (MFR), which is the ratio of the high load melt index (HLMI) divided by the melt index (MI). HLMI is measured by ASTM method 1238-70, Condition F and MI is measured by ASTM method 1238-70, condition E.

In one embodiment, the present invention is a method of making polyethylene comprising adjusting the aluminoxane to chromium ratio to control the MWD of the polyethylene. Generally, this ratio is increased to broaden the MWD and decreased to narrow the MWD.

We have now discovered a process for polymerizing olefins comprising contacting an olefin with a catalyst comprising aluminoxane and chromium, at a total pressure between 20 and 2000 psi, preferably between 50 and 600 psi, and temperature between 50 and 130° C., preferably between 75 and 110° C., wherein the ratio of aluminoxane to chromium in the reactor is periodically adjusted to thereby adjust the molecular weight distribution of the resulting polymer.

In one embodiment the present invention is an olefin polymerization process comprising continuously reacting an alpha-olefin with a catalytically effective combination of a chromium compound and an aluminoxane to produce a polyalpha-olefin, wherein the ratio of said aluminoxane to said chromium compound is adjusted over time by at least five percent, so that the molecular weight distribution of said produced polyalpha-olefin is varied over time.

The Catalyst

The catalyst useful in this invention comprises at least one aluminoxane and chromium.

Aluminoxanes are well known in the art, although their structures vary. See S. Pasynkiewicz, Polyhedron, Vol. 9, (1990) p 429–593, which is incorporated herein by reference. As used herein the term aluminoxane is meant to include an aluminoxane having a single alkyl group or a mixture of aluminoxanes having different alkyl groups.

Examples of useful aluminoxanes include those obtained by controlled substoichiometric hydrolysis of trialkylaluminum compounds, where the water of hydrolysis is generally supplied via hydrated metal salts (eg., $CuSO_4.5H_2O$, $MgSO_4.7H_2O$, etc), or methods described by Pasynkiewicz. Hydrolysis using hydrated metal salts is preferred. Aluminoxanes can also be purchased, for example from Schering-Berlin Polymers, Ethyl Corporation or Akzo Chemical Company (Texas Alkyls). Other useful methods for the preparing aluminoxanes are described in U.S. Pat. Nos. 4,960,878 and 4,945,076 and European Patent Application 315,234.

Preferred aluminoxanes include isobutylaluminoxane (IBAO), methylaluminoxane and ethylaluminoxane (EAO). Isobutylaluminoxane (IBAO) is especially preferred.

A variety of chromium compounds are useful in the invention. Suitable chromium compounds include chromium compounds in the +2, +3, +4 and +6 oxidation state.

Chromium compounds suitable for preparing catalyst useful in this invention include chromium chelates or complexes derived from an orthohydroxyphenyl ketone, a substituted or non-substituted salicylaldehyde, and an N-substituted or non-substituted salicylamide, the chromium chelates or complexes being essentially of the formula

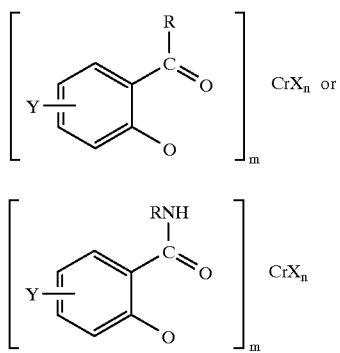

wherein R is individually selected from hydrogen, alkyl, alkenyl, aryl, cycloalkyl, cycloalkenyl, and arylalkyl radicals and combinations of these radicals with each R containing 0–20 carbon atoms and a corresponding valence-satisfying number of hydrogen atoms, X is an inorganic or organic negative group relative to chromium such as halide, alkyl, alkoxy, and the like, Y is selected from hydrogen, hydroxyl, alkoxy, and alkyl groups, m is a whole number of 1 to 3, n is a whole number of 0 to 2, and m plus n is 2 or 3. These compounds are described in U.S. Pat. No. 4,071,673, which is incorporated herein by reference.

Another useful class of chromium compounds are chromium salts or derivatives of a carboxylic acid conforming to the formula

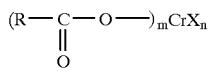

wherein R is selected from hydrogen, alkyl, alkenyl, aryl, arylalkyl, cycloalkyl and cycloalkenyl radicals and combinations of these radicals with R containing 0–30 carbon atoms and a corresponding number of valence-satisfying hydrogen atoms, m is a whole number of 1 to 3, n is a whole number of 0 to 2, m plus n is 2 or 3 and X is an inorganic or organic negative group relative to chromium such as halide, alkyl, alkoxy and the like. Typical chromium compounds of this description are chromium (III) formate, chromium (III) acetate, chromium (III) propionate, chromium (III) butyrate, chromium (III) pentanoate, chromium (III) benzoate, chromium (III) naphthenate, chromium (III) oleate, chromium (III) oxalate, chromium (II) formate, chromium (II) acetate, chromium (II) propionate, chromium (II) butyrate, chromium (II) pentanoate, chromium (II) benzoate, chromium (II) naphthenate, chromium (II) oleate, chromium (II) oxalate.

Other useful chromium compounds are chelated or complexed chromium compounds containing organic ligands, such as those prepared by Hwang in U.S. Pat. No. 4,096,093, which is incorporated herein by reference. These compounds can be prepared by reacting chromium (III) carboxylate salts with organic nitrogen compounds, such as diamines. This reaction produces $N_1N$-type chelates or aryl amines complexes of trivalent chromium.

Other useful chromium compounds are inorganic chromium salts, such as chromium bromide, chromium fluoride, chromium iodide, chromium chloride, chromyl chloride, chromyl bromide, chromyl fluoride, chromyl iodide, chromium (III) phosphate, and chromium (III) sulfate.

Additionally, useful organic chromium compounds include chromium chelates derived from one or more beta-dicarbonyl compounds that may be either acyclic or cyclic, the chelates having the formula

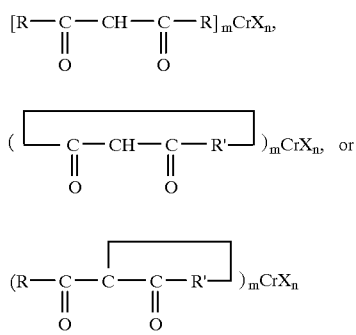

wherein R is individually selected from hydrogen, alkyl, alkenyl, aryl, cycloalkyl, cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkylene radicals and combinations of these bivalent radicals with R' containing 1–20 carbon atoms and a corresponding valence-satisfying number of hydrogen atoms, m is a whole number of 1 to 3, n is a whole number of 0 to 2 and m plus n is 2 or 3 and X is an inorganic or organic negative group (relative to chromium) such as halide, alkyl, alkoxy, and the like. Typical compounds are chromium acetylacetonate, chromium benzoylacetonate, chromium 5,5-dimethyl-1,3-cyclohexanedionate, chromium 2-acetylcyclohexanonate and the like.

Another group of organic chromium compounds useful in this invention are the π-bonded organochromium compounds of the structure

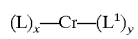

disclosed, for example, in U.S. Pat. Nos. 3,806,500 and 3,844,975. Here L and $L^1$ are the same or different organic ligands which are adapted to being pi-bonded to the chromium atom, and x and y are each integers of 0 to 3, inclusive, and x plus y equals 2 to 6, inclusive. Typical compounds of this group are bis(cyclopentadienyl) chromium (II), bis(benzene)chromium (O), cyclopentadienyl chromium tricarbonyl hydride.

Still another group of chromium compounds which may be used in the present invention include several types of chromate esters. A simple type is organic chromate of the formula

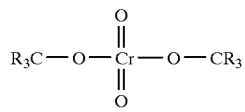

wherein R is individually selected from hydrogen or a hydrocarbyl radical containing about 1–14 carbon atoms, preferably about 3–10 carbon atoms, including alkyl, aryl, arylalkyl, cycloalkyl, alkenyl and cycloalkenyl groups.

Typical compounds are bis(triphenylmethyl) chromate, bis (tributylmethyl)chromate, etc.

Another group of chromate esters are organosilyl chromates, such as described in Granchelli et al U.S. Pat. No. 2,863,891 which is incorporated herein by reference. These esters have the general formula.

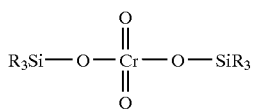

wherein R is individually selected from hydrogen and a wide range of hydrocarbyl groups similar to those just described immediately above. A typical compound is bis (triphenylsilyl)chromate.

A third type of chromate ester which may be used in this invention is chromyl bis(trihydrocarbyltitanate), such as disclosed in U.S. Pat. No. 3,752,795, and has the general formula

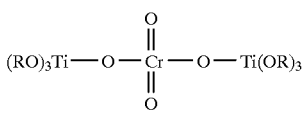

wherein R is individually selected from a wide range of hydrocarbyl radicals described immediately above. A typical compound is chromyl bis(tributyltitanate).

Still another type of chromate ester is chromyl bis (dihydrocarbylphosphate), such as disclosed in U.S. Pat. No. 3,474,080 which is incorporated herein by reference. This ester has the general formula

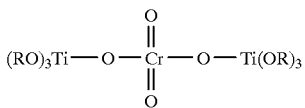

wherein R is again individually selected from a wide variety of hydrocarbyl groups described immediately above. A typical compound is chromyl bis(diphenylphosphate).

Another group of organic chromium compounds useful in this invention are tetravalent organochromium compounds of the structure $Y_4Cr$ or $(YO)_4Cr$ disclosed, for example, in U.S. Pat. Nos. 3,875,132 and 4,016,343, which are both incorporated herein by reference. In these compunds, Y is individually selected from alkyl, alkenyl, cycloalkyl, cycloalkenyl, cycloalkyl-substituted alkyl, or aryl-substituted alkyl radicals containing 1 to about 14 carbon atoms and the tetravalent chromium atom is directly linked to one of the carbon atoms in each alkyl group or to oxygen. Typical compounds of this group are tetrakis(neopentyl) chromium(IV), tetrakis(tertiarybutyl)chromium(IV), tetrakis(t-butoxy)chromium(IV), etc.

Another useful class of chromium compounds useful in this invention are those described by Theopold, *J. Am. Chem. Soc.* (1988), 110, 5902 entitled "Cationic Chromium (III) Alkyls as Olefin Polymerization Catalysts," Theopold *Acc. Chem. Res.* (1990), 23, 263 entitled "Organochromium (III) Chemistry: A Neglected Oxidation State" and Thomas et al., *J. Amer Chem. Soc.*, 113 (1991), p. 893 et seq.

These and related pentamethylcyclopentadienyl chromium (III) alkyls can be used in this invention. Examples of these compounds include compounds having the following general formulas:

or

wherein $(C_5(R')_5)$ is a cyclopentadienyl or substituted cyclopentadienyl ring; R' is at each independent occurrence hydrogen, a hydrocarbyl radical having 1–20 carbon atoms, or adjacent R' groups may together form one or more rings; X is a hydrocarbyl radical having 1–20 carbon atoms; a=1 or 2, b=1 or 2 where a+b=3; L is at each independent occurrence a sigma donor stabilizing ligand; m=1 to 2 inclusive; and A is an anion.

These chromium compounds include monomeric chromium compounds, dimeric chromium compounds, and cationic chromium compounds. A preferred monomeric chromium compound is $Cp^*Cr(CH_3)_2(THF)$, $[Cp^*Cr(CH_3)_2]_2$ is a preferred dimeric compound. And a preferred cationic compound is $[CP^*CrCH_3 (THF)_2]^+[BPh4]^-$.

Calcined chromium compounds, such as those produced by calcination in oxygen of chromium(III)2-ethylhexanoate at elevated temperatures such as up to 1500° F. are also useful. Mixture of chromium compounds can also be used.

Preferred chromium compounds include chromium(II) acetate, chromium(III)tris(2-ethyl-hexanoate), chromium (III)acetylacetonate, chromium(III)oxide, chromyl chloride (CrVI), bis(triarylsilyl) chromates (CrVI), and bis (trialkylsilyl) chromates (CrVI). All of these may optionally be supported on a refractory inorganic oxide. Especially preferred chromium compounds useful in this invention are carboxylic acid salts of chromium, especially $Cr_2(II) OAc_4.H_2O$ by itself or supported on a refractory inorganic oxide.

Additional components may be used with the catalyst of this invention. These include trialkylaluminums, trialkoxyaluminums, trialkylboranes, silane compounds having at least one Si—H bond, and the like. Moreover, titanium, zirconium and vanadium components can also be added; these include metallocene compounds as well as Ziegler-Natta transition metal compounds of Ti, V and Zr, such as those disclosed in U.S. Pat. No. 4,701,432 to Welborn, Jr., which is incorporated herein by reference.

In a preferred embodiment, the catalyst employed consists essentially of a chromium compound which is free of any electron donating ligands (isonitriles, amines, ethers, sulphides), or carbon dioxide, and which may be supported or unsupported, and an aluminoxane.

The method of preparing the catalyst is not critical. One method of preparing the catalyst useful in this invention is to combine the chromium compound with the aluminoxane in an inert solvent at a temperature of from about 40–100° C.

Surprisingly, we have found that some combinations of aluminoxane and chromium are not effective for polymerization. (See Table I). Others do not have sufficient productivity to be commercially attractive. The effectiveness of the chromium compounds can depend on whether the compounds are supported or unsupported. Those combinations which are catalytically effective can be readily determined by a simple procedure. The simple test conditions are described in Example 1. When the productivity value, i.e., the amount of polyethylene produced in one hour under these test conditions is greater than 5 grams, then the combination of aluminoxane and chromium is catalytically effective. Thus, a catalytically effective combination is one which results in at least five grams of polymer when reacted according to the procedure of Example 1, herein below.

To adjust the molecular weight distribution of the produced polyolefin, the mole ratio of aluminoxane to chromium may be varied in the range between 2:1 to 500:1, preferably between 5:1 to 200:1. Using a ratio in this range, the molecular weight distribution may be varied over the range of from 5 to 200, more typically from 10 to 100. At certain aluminoxane to chromium ratios, the molecular weight distribution of the resulting polyolefin can surprisingly become distinctly bimodal.

When the organochromium compounds are supported, the support for the catalysts useful in this invention can be selected from among refractory inorganic oxides such as silica, alumina, silica aluminas, mixtures of silica and alumina and metal phosphates, such as aluminum phosphate, zirconium phosphate and alumina aluminum phosphate, and others as described, for example in U.S. Pat. Nos. 4,080,311; 4,210,560; 4,219,444; 4,376,067; 4,382,877 and 4,382,878.

Other cocatalysts, besides aluminoxane, have been combined with chromium to see their effect on production of polymer and MWD. DEALOX, an alkylaluminum alkoxide, trialkylaluminums, such as triisobutylaluminum, and triethylborane were tested and found to be inactive or unsatisfactory.

Polymerization

Useful olefins that can be polymerized in the process of this invention include alpha-olefins, such as ethylene, propylene, 1-butene, 1-hexene, and the like. Other useful olefins include 4-methyl-1-pentene. Ethylene is preferred. Mixtures of olefins can also be used, for example ethylene and either 1-butene, 1-hexene or 1-octene can be used to prepare linear low density polyethylene.

The resulting polyolefin preferably is a solid polyalpha-olefin, such as polyethylene, linear low density polyethylene and polypropylene; more preferably it is a solid polyethylene. More preferably, the resulting polyolefin is high density polyethylene.

Polymerization can be conducted in the liquid (slurry) phase using an inert hydrocarbon solvent such as propane butane, isobutane, pentane, hexane or the like. Alternatively, the polymerization can be conducted in the gas phase. Slurry phase polymerizations are preferred. The polymerization conditions, for example temperature and pressure, are those well known in the art for olefin polymerization.

In one embodiment, the present invention is an alpha-olefin polymerization process comprising,
a) continuously reacting an alpha-olefin with a catalytically effective combination of a chromium compound and an aluminoxane at a first aluminoxane to chromium ratio to produce a polyalpha-olefin having a first molecular weight distribution; and
b) changing the aluminoxane to chromium ratio by at least five percent thereby giving a second aluminoxane to chromium ratio to produce a polyalpha-olefin having a second molecular weight distribution.

Generally the aluminoxane to chromium ratio is adjusted by at least 10% and often by 1000–2000 percent during this process. A key advantage of this process is that the weight average molecular weight (Mw) of the produced polymer can be kept approximately constant, although the MWD (Mw/Mn) can be adjusted with the aluminoxane to chromium ratio. Thus, melt characteristics, flow characteristics and moldability of the polymer can be adjusted as the polymer is produced.

The molecular weight of the polymer (Mw) can be modified using hydrogen, low concentrations of oxygen, acetylene, olefins, dienes, and other molecular weight modifiers well known in the art.

EXAMPLES

The following examples illustrate the present invention. These examples are not, however, intended to limit the invention in any way.

Example A—Preparation of Aluminoxane

A-1

IBAO was prepared by hydrolyzing a 1.0 molar solution of triisobutylaluminum in heptane with one equivalent of water, derived from $MgSO_4 \cdot 7H_2O$.

A-2

IBAO and EAO were purchased from Akzo Chemicals, (Texas Alkyls) Dobbs Ferry, N.Y., as a 1.0 molar solution in heptane.

Example I—Screening Procedure

All manipulations involving catalyst components were conducted under an inert argon atmosphere. Heptane solvent was stirred over concentrated sulfuric acid, stored over calcium hydride and distilled from sodium benzophenone ketyl before use. A 1 liter Autoclave Engineers pressure reactor was dried at 150° C. in vacuo for at least two hours, and then allowed to cool to 80° C. prior to each polymerization.

The reactor was charged with 450 ml of a heptane slurry containing between 20–40 micromoles of chromium. Stirring was started at 1000 RPM and after the temperature equilibrated at 80° C., a 1.0 molar aluminoxane solution in heptane was added by syringe. The amount of aluminoxane added was about 6 mmoles. Isobutylaluminoxane (IBA0) was generally used, although ethylaluminoxane (EAO) was also tested. The reactor was pressurized with 250 psi argon and 300 psi ethylene. Polymerizations were allowed to proceed for 2 h. A small amount of oily wax, typically 1–5% of the polymer yield, is also produced. This oily wax is a highly branched polyolefin, having typically greater than 50 side chain branches per thousand carbons as determined by $C_{13}$ NMR. It appears that 1-butene is formed and incorporated into this oil. The polymer results are summarized in Table I. A linear polyethylene is produced. Activity is measured in grams of polymer per gram of chromium/hour. If less than 5 grams of polymer was produced in two hours, it was deemed that essentially no reaction had occurred; in some instances, there was no polymer produced. Activities greater than 2000 g of polymer per gram of chromium/hour are commercially attractive.

The silica support, EP-10, is a Crossfield silica having a pore volume of 1.6 cc/gm and surface area of 325 $m^2$/gm. The chromium, vanadium catalyst in Run No. 14 in Table I was prepared from Vanadium (III) acetylacetonate and chromium (III) acetylacetonate.

TABLE I

Polymerization Using Various Chromium Sources and/or Aluminoxanes

| Run No. | Catalyst[1] | Aluminoxane | Activity |
|---|---|---|---|
| 1 | $Cr(acac)_3$ | IBAO | 11,600[a] |
| 2 | Cr(2-ethylhexanoate) | IBAO | ~5000[a] |
| 3 | 1% $Cr/SiO_2$[b] | IBAO | 7,750 |
| 4 | 0.6% $Cr/AlPO_4$[c] | IBAO | 9,400 |
| 5 | $Cp_2Cr$[d] | IBAO | no reaction |
| 6 | $Cp_2Cr/AlPO_4$ | IBAO | 14,100 |
| 8 | $Cr_2OAc_4.H_2O$ | EAO | 3,300 |
| 9 | $Cr_2OAC_4.H_2O$ | IBAO | 3,100 |
| 10 | chromium $NO_3.9H_2O$ | IBAO | no reaction |
| 11 | $[(CH_3)_5C5Cr(CO)_2]_2$ | IBAO | no reaction |
| 12 | chrome(III)oxide | IBAO | no reaction |
| 13 | chromyl(VI)chloride[e] on EP-10 | IBAO | 12,900 |
| 14 | $Cr(III)(acac)_3$[e] | IBAO | 15,800 |
| 15 | $Bis(Ph_3Si) Cr(VI)$ | IBAO | 10,400 |
| 16 | 0.9% Cr, 0.9% V on EP-10 | IBAO | 14,200 |

[1]Unsupported, unlesss otherwise noted.
[a]Reaction run at 550 psi ethylene
[b]Cr (III) derived from chromium acetate
[c]Cr (III) derived from chromium 2-ethylhexanoate
[d]Cp = cyclopentadienyl
[e]200 mg catalyst, 6 mL IBAO used for this polymerization

TABLE II

Polymerization Using Unsupported $Cr_2OAc_4.H_2O$ and IBAO

| Run No. | mLs IBAO | Al/Cr Mole Ratio | Mw ×10⁻⁵ | Mw/Mn | Mz/Mn | Tm °C. | Yield |
|---|---|---|---|---|---|---|---|
| 1 | 2 | 18:1 | 1.98 | 12.12 | 58.91 | 135.25 | 44 g |
| 2 | 3.5 | 31:1 | 2.21 | 13.98 | 69.62 | 133.70 | 54 g |
| 3 | 4 | 36:1 | 1.91 | 14.36 | 70.98 | 135.70 | 30 g |
| 4 | 6 | 54:1 | 2.07 | 14.68 | 79.43 | 133.64 | 54 g |
| 5 | 8 | 72:1 | 1.81 | 15.47 | 83.68 | 131.01 | 51 g |
| 6 | 10 | 90:1 | 1.85 | 15.29 | 78.10 | NA | 48 g |
| 7 | 11 | 99:1 | 1.94 | 16.03 | 81.65 | NA | 52 g |

TABLE III

Use of Alternative Cocatalysts with $Cr_2OAc_4.H_2O$

| Catalyst | Cocatalyst | Yield |
|---|---|---|
| $Cr_2OAc_4.H_2O$ | TEB | NR |
| $Cr_2OAc_4.H_2O$ | $^iPrMgCl$ | NR |
| $Cr_2OAc_4.H_2O$ | none | NR |
| IBAO | none | NR |
| $Cr_2OAc_4.H_2O$ | TIBAL | NR |

Example II—Varying Aluminoxane to Chromium Ratios

The procedure of Example I was followed using 22 mg of chromium (II) acetate monohydrate [$Cr_2(OAc)_4.H_2O$] and 1.0 molar IBAO. The IBAO was prepared as in Example A-1. The results are summarized in Table II. At the higher aluminoxane to chromium ratios (such as Al/Cr equal to 90:1 or 99:1, the molecular weight distribution was distinctly bimodal, as indicated by gel permeation chromatography (GPC). Chromatography was done on a DuPont GPC chromatograph using silanized 6 microns pore silica at a temperature of 145° C. The polymers were dissolved in 1, 2, 4 trichlorobenzene. As can be seen, in the molecular weight distribution was varied over the range from 10 to 20.

Figure 2:
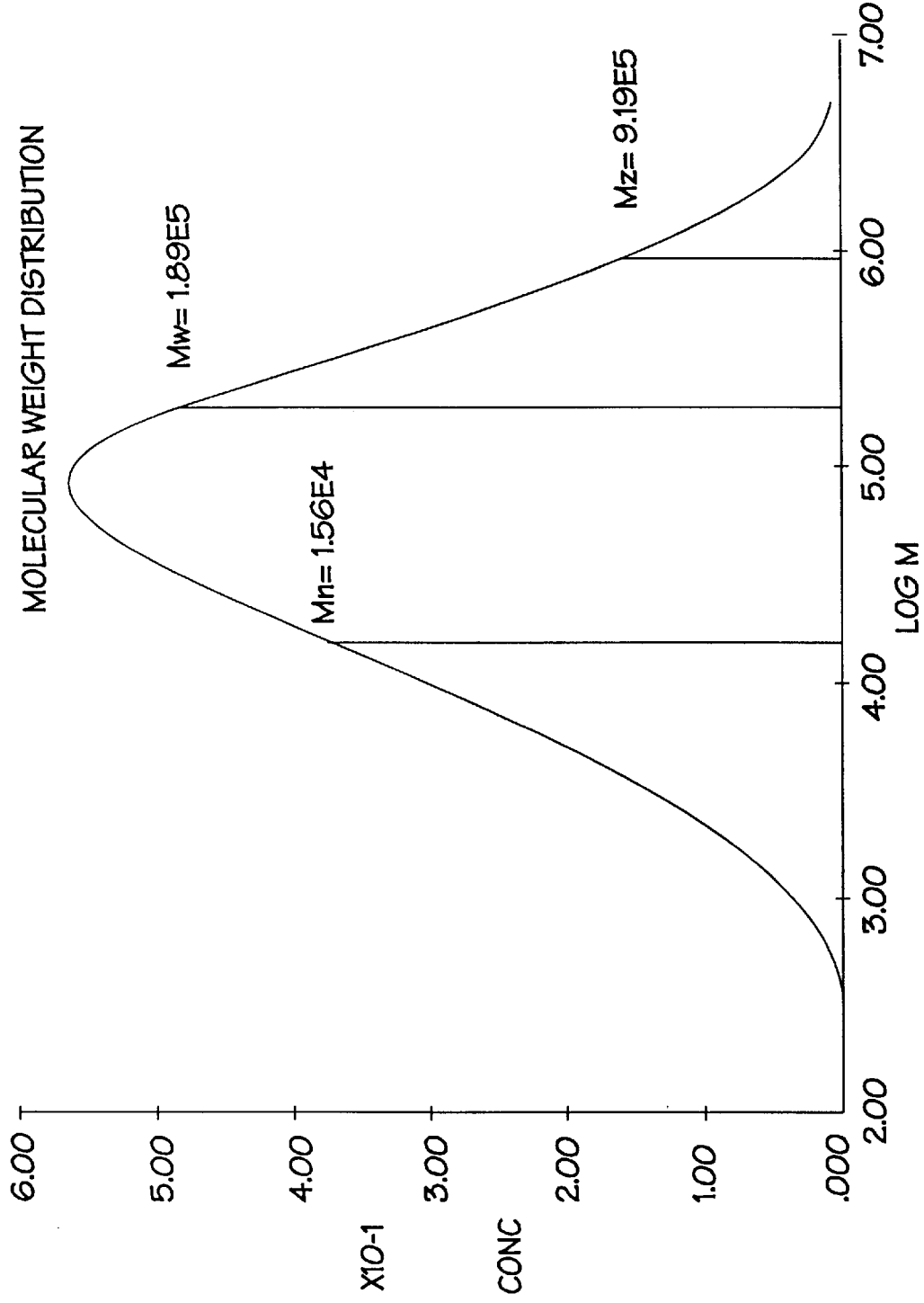
FIG. 2 is an HPLC trace of a polyethylene sample produced at an Al/Cr ratio of 18:1.
Figure 3:
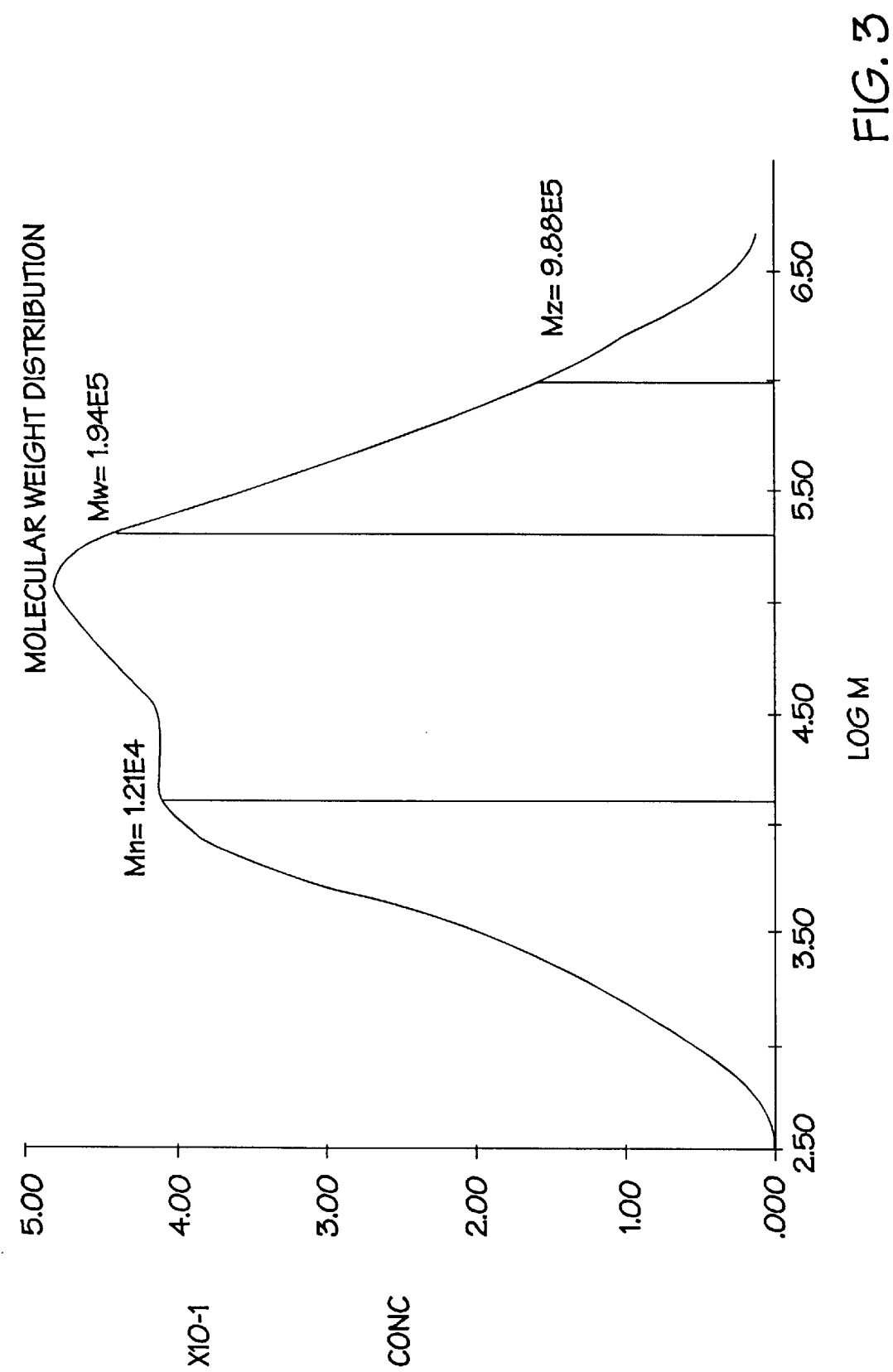
FIG. 3 is an HPLC trace of a polyethylene sample produced at an Al/Cr ratio of 99:1.

FIG. 1 shows the GPC for Run No. 1 in Table II. The molecular weight distribution is broad at this 18:1 aluminoxane to chromium ratio. FIG. 2 shows the broad and distinctly bimodal, molecular weight distribution obtained when the aluminoxane to chromium ratio of 99:1 was used (Run 7, Table II). Note that the Mw is essentially independent of the amount of aluminoxane added, although the Mw/Mn increases with increasing aluminoxane to chromium ratios.

Comparative Example III—Alternative Cocatalysts

The procedure of Example II was followed except that IBAO was replaced by alternative co-catalysts known in the art. These included triethylboron (TEB), isopropyl magnesium chloride ($^iPrMgCl$) and triisobutyl aluminum (TIBAL). These results are summarized in Table III. As can be seen, the aluminoxane cocatalyst is unique in its effectiveness, and isobutyl aluminoxane alone does not give polyethylene product.

Example IV—Continuous Polymerization

A continuous ethylene polymerization reaction is operated at 100° C. and at an ethylene pressure of 200 psi in a slurry reactor containing 60 lbs. of isobutane as diluent. Chromium (II) acetate monohydrate in isobutane and isobutyl aluminoxane in hexane are continuously fed into the reactor. The chromium feed rate is 0.01 lbs/hr. Initially the aluminoxane feed rate is 20× the chromium feed rate on a molar basis. 1000 lbs of polyethylene with a MWD of about 12 is produced over 2 days. Thereafter, the aluminoxane feed rate is increased by a factor of 5 (aluminoxane to chromium ratio=100). Another 1000 lbs of polyethylene is produced over the next two days. This polymer has a bimodal molecular weight distribution and an Mw/Mn of about 16.

While this invention has been described in detail for the purpose of illustration, it is not to be construed as limited thereby but is intended to cover all changes and modifications within the spirit and scope thereof.

What is claimed is:

1. A method of controlling the molecular weight distribution of a polyalpha-olefin during polymerization, comprising changing the aluminoxane to chromium ratio of a polymerization catalyst comprising chromium and at least one aluminoxane during polymerization to thereby adjust the molecular weight distribution of the produced polyalpha-olefin.

2. The method of claim 1 wherein the ratio is increased to give a broader molecular weight distribution.

3. The method of claim 1 wherein the ratio is decreased to give a narrower molecular weight distribution.

4. The process of claim 1 wherein the aluminoxane to chromium ratio is varied in the range between 5:1 and 200:1.

5. The process of claim 1 wherein the alpha-olefin comprises ethylene.

6. A process as recited in claim 1 wherein said aluminoxane is an alkyl aluminoxane.

7. A process as recited in claim 6 wherein said aluminoxane is selected from the group of isobutylaluminoxane, methylaluminoxane and ethylaluminoxane.

8. A process as recited in claim 7 wherein said aluminoxane is isobutylaluminoxane.

9. A process as recited in claim 1 wherein said chromium compound has an oxidation state selected from the group consisting of +2, +3, and +6.

10. A process as recited in claim 9 wherein said chromium compound has an oxidation state of +2.

11. A process as recited in claim 9 wherein said chromium compound is a carboxylic acid salt of chromium.

12. A process as recited in claim 9 wherein said chromium compound is selected from the group consisting of chromium tetraacetate monohydrate, chromium triacetylacetonate, chromium (2-ethylhexanoate), chromium on aluminaphosphate, chromocene on aluminaphosphate, chromyl chloride, bis(trialkylsilyl)chromates and bis(triarylsilyl)chromates.

13. A process as recited in claim 1 wherein the aluminoxane to chromium ratio is varied in the range between 2:1 to 500:1 so that the molecular weight distribution is varied over the range of from 10 to 100.

14. A process as recited in claim 1 wherein the aluminoxane to chromium ratio is varied in the range between 5:1 and 200:1.

15. A process as recited in claim 1 wherein said catalyst is supported on a refractory inorganic oxide.

16. A process as recited in claim 15 wherein said refractory inorganic oxide is a metal phosphate.

17. A polymerization process as recited in claim 1 wherein the resulting product consists essentially of a high density polyethylene.

18. A process for polymerizing olefins comprising contacting an olefin with a catalyst comprising a catalytically effective amount of an aluminoxane and a chromium compound wherein the ratio of aluminoxane to chromium is periodically adjusted to thereby adjust the molecular weight distribution of the resulting polymer.

19. An olefin polymerization process comprising continuously reacting an alpha-olefin with a catalytically effective combination of a chromium compound and an aluminoxane to produce a polyalpha-olefin, wherein the ratio of said aluminoxane to said chromium compound is adjusted over time by at least five percent, so that the molecular weight distribution of said produced polyalpha-olefin is varied over time.

20. A process as recited in claim 19 wherein said chromium compound is a carboxylic acid salt of chromium.

21. A continuous ethylene polymerization process comprising the steps of:

(a) combining a catalytically effective amount of a chromium compound and an aluminoxane in a hydrocarbon solvent, to produce a catalyst;

(b) mixing said catalyst with an alpha-olefin at a temperature of between 75 to 110° C. and at an olefin pressure of from 50–550 psi for an average residence time of from one to five hours; and (c) varying the ratio of said aluminoxane to said chromium compound so that the molecular weight distribution of the resulting polyethylene is modified over time.

22. A continuous polymerization process which produces two separate polyalpha-olefin products comprising, a) reacting an alpha-olefin with a catalytically effective combination of a chromium compound and an aluminoxane at a first aluminoxane to chromium ratio to produce a first polyalpha-olefin product having a first molecular weight distribution; and b) changing the aluminoxane to chromium ratio by at least five percent thereby giving a second aluminoxane to chromium ratio to produce a second polyalpha-olefin product having a second molecular weight distribution.

23. An alpha-olefin polymerization process comprising, a) continuously reacting an alpha-olefin with a catalytically effective combination of a chromium compound and an aluminoxane at a first aluminoxane to chromium ratio to produce a polyalpha-olefin having a first molecular weight distribution; and b) changing the aluminoxane to chromium ratio by at least five percent thereby giving a second aluminoxane to chromium ratio to produce a polyalpha-olefin having a second molecular weight distribution.

* * * * *